United States Patent
Tenglund

(10) Patent No.: US 7,452,009 B2
(45) Date of Patent: Nov. 18, 2008

(54) HOSE COUPLING FOR CONNECTION TO A RIGID TUBE CONNECTION, AND METHOD FOR MAKING SUCH A CONNECTION

(75) Inventor: Lars Tenglund, Svanesund (SE)

(73) Assignee: Volvo Lastvagnan AB, Gothenburg (SE)

( * ) Notice: Subject to any disclaimer, the term of this patent is extended or adjusted under 35 U.S.C. 154(b) by 0 days.

(21) Appl. No.: 11/279,450

(22) Filed: Apr. 12, 2006

(65) Prior Publication Data

US 2006/0175833 A1    Aug. 10, 2006

Related U.S. Application Data

(63) Continuation of application No. PCT/SE04/01842, filed on Dec. 10, 2004.

(30) Foreign Application Priority Data

Dec. 17, 2003    (SE) .................................. 0303447-7

(51) Int. Cl.
*F16L 17/00*    (2006.01)
(52) U.S. Cl. .................. 285/364; 285/242; 285/252; 285/337
(58) Field of Classification Search ......... 285/241–242, 285/252, 334.5, 337, 339, 364–368, 370, 285/903, 148.8, 148.26
See application file for complete search history.

(56) References Cited

U.S. PATENT DOCUMENTS 5,470,114 A * 11/1995 Umney et al. ................ 285/367

2004/0150225 A1 * 8/2004 Roberts et al. .............. 285/340

FOREIGN PATENT DOCUMENTS

| DE | 19642580 A1 | 6/1998 |
|----|----|----|
| EP | 0338880 A1 | 10/1989 |
| SE | 465479 B | 9/1991 |
| SU | 496427 A1 | 2/1976 |
| WO | 0214729 A1 | 2/2002 |

* cited by examiner

*Primary Examiner*—Aaron M Dunwoody
*Assistant Examiner*—Fannie Kee
(74) *Attorney, Agent, or Firm*—WRB-IP LLP

(57) ABSTRACT

A coupling for connecting an elastic hose to a rigid tube connection is provided, which tube connection has a peripheral, rigid rim, at least one rigid supporting member with a radially inward facing annular supporting surface being arranged so as to offer support to the hose end at the tube connection, in which the coupling includes an inner ring having two end portions, the inner ring being arranged so as, in a mounting state, to have its end portions mutually overlapping and lending the inner ring a smaller diameter than the hose and, in a mounted state inside the hose, directly opposite the inward facing supporting surface, to be expanded by the pressing-together of its end portions, end to end, to maintain a chosen larger diameter in order, within the hose, to clamp the hose end between the inner ring and the inward facing supporting surface, and in which the cross section of the inner ring is shaped with an arcuate portion and the supporting surface in the supporting member is correspondingly arched.

14 Claims, 3 Drawing Sheets

HOSE COUPLING FOR CONNECTION TO A RIGID TUBE CONNECTION, AND METHOD FOR MAKING SUCH A CONNECTION

The present application is a continuation of International Application PCT/SE2004/001842, filed Dec. 10, 2004, which claims priority to SE 0303447-7, filed Dec. 17, 2003, both of which are hereby incorporated by reference.

BACKGROUND AND SUMMARY

The present invention relates to a hose coupling in which the rubber material in the hose is compressed with the aid of a sleeve which expands from within. The present invention also relates to a process for mounting a hose coupling.

Hose couplings for hoses, designed to withstand high pressures, are very often configured with an inner part which is pressed into the hose. This inner part is configured to fit an opposing coupling. Threaded over the hose is an outer sleeve, which is pressed together in a hydraulic press. In this way, a permanent even compression of the rubber material is obtained. Various forms of channels or grooves prevent the hose from sliding off the coupling. Coupling parts for relatively small dimensions are usually turned from bar material or tube material.

In the case of couplings of larger dimensions, for example for charge-air tubes for internal combustion engines, it is financially advantageous to press the parts from sheet material in a hydraulic press.

From Swedish patent SE 465479, it is known that an inner hose coupling part is able to be produced according to this method. However, this coupling extends far in the longitudinal direction, so that, if the installation length is limited, there is little space left for the hose material itself, which is to absorb the movement between, for example, the engine and the chassis-mounted charge-air cooler.

For some while there have also been charge-air hoses in mass production which are made without pressing process between an inner and outer coupling part, but these do not withstand a sufficiently high internal overpressure. Future engines with higher emission-cleaning requirements will have higher charge-air pressure than contemporary engines.

It is desirable to provide a hose coupling which withstands a high pressure but still has a short installation length. It is desirable to provide a process for mounting the hose coupling according to the invention.

According to an aspect of the present invention, a coupling arrangement for connecting an elastic hose and a rigid tube connection in a fluid line is provided. The coupling arrangement includes a hose made of an elastic material and a rigid tube connection having a peripheral, rigid rim to which an end of the hose is adapted to be connected, at least one rigid supporting member with a radially inward facing annular supporting surface being arranged so as to offer support to the hose end at the tube connection. The coupling arrangement also includes a coupling comprising an inner ring having two end portions, wherein, prior to and in a mounting state, the two end portions of the inner ring are adapted to overlap so that the inner ring has a first diameter smaller than an inner diameter of the hose and wherein, in a mounted state inside the hose in which the inner ring is opposite the inward facing supporting surface, the two end portions are adapted to be pressed together, end to end, to maintain a second diameter larger than the first diameter to clamp the hose end between the inner ring and the inward facing supporting surface, wherein a cross section of the inner ring is substantially bowl-shaped and wherein the inward facing supporting surface in the supporting member is correspondingly arched.

According to another aspect of the present invention, a process is provided for connecting a hose to a rigid tube connection having a peripheral rim to which a hose end, made of elastic material, is to be connected. According to the process, an inner ring is introduced into the hose in a mounting state with two ends mutually overlapping, so as to lend the ring a smaller diameter than the inner diameter of an end of the hose. The inner ring is positioned directly opposite a rigid supporting member of the tube connection, the rigid supporting member having a radially inward facing supporting surface, the hose end being disposed between the supporting member and the supporting surface. The inner ring is pressed radially outward against the hose end to clamp the hose end against the supporting surface. The hose end is connected to the tube connection by a binding clamp that encompasses a peripheral rim of the tube connection and the hose end.

BRIEF DESCRIPTION OF THE DRAWINGS

The invention will be described in greater detail below with two illustrative embodiments with reference to the appended drawings, in which.

DETAILED DESCRIPTION

Figure 1:
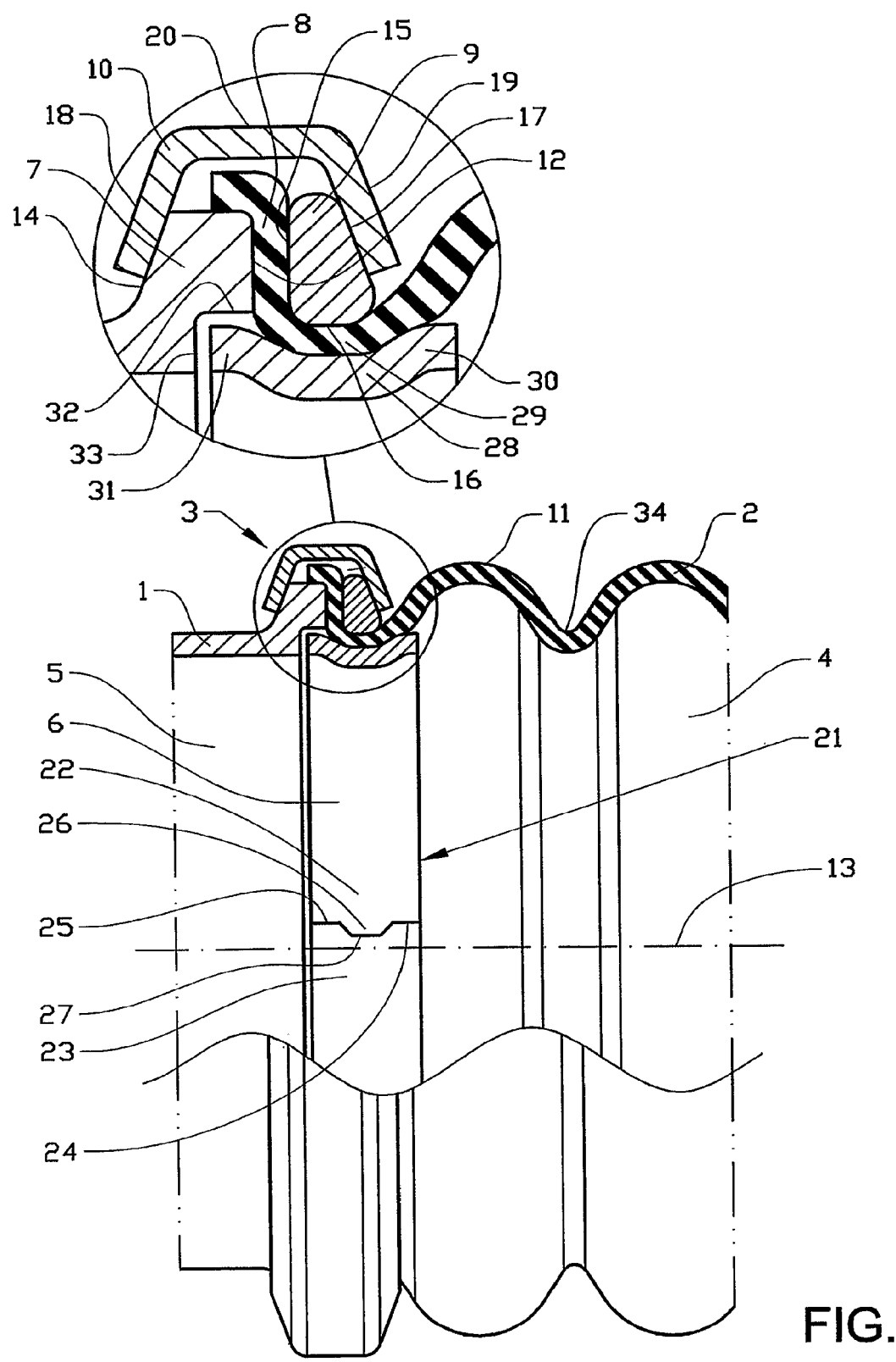
FIG. 1 shows, with a partially broken view, an assembled coupling according to the invention in a first illustrative embodiment, connected to an opposing tube connection.

In FIG. 1 is shown a portion of a tube connection 1, to which a hose 2 is connected by means of a coupling 3, which is here shown in a first illustrative embodiment according to the invention. The tube connection is a rigid part and is usually made of metal and can be a connection to, for example, a charge-air cooler for an internal combustion engine in a motor vehicle, for example a goods vehicle. The tube connection and the hose together form a fluid duct 4. The hose is bellows-shaped with wave crests 11 and wave troughs 34 in order firstly to withstand high pressures and secondly to be flexible to facilitate coupling to the tube connection.

The hose is advantageously realized as a reinforced elastic hose, for example made of rubber, with specially adapted hose ends. The tube connection 1 has a circular connection opening 5, the end portion of the hose also forming a connection opening 6 which, in the mounted state of the hose, is intended to be located coaxially with the connection opening 5 in the tube connection. The tube connection 1 has a radially outward facing flange 7 or collar, which forms a circular, peripheral rim around the connection opening 5 in the tube connection. Correspondingly, the hose end has a peripheral end portion 8, which encloses the connection opening in the hose end. In order to hold the hose end together against the tube connection, two outer rings 9 and 10 made of a rigid material, expediently metal material, are provided, one outer ring 9 being arranged so as to be clamped against the end portion 8 of the hose by means of the other outer ring 10, which is hereinafter referred to as a clamp.

The end portion 8 of the hose is configured so that it bears against the flange 7 of the tube connection, more precisely against a front face 12, which faces forward toward the hose end and which, in the illustrated example, is flat and extends annularly in a radial plane for the tube connection, i.e. perpendicular to the geometric longitudinal axis 13 of the tube connection. The flange, furthermore, has a rear-facing annular edge surface 14, which in the illustrated example is conical.

The first outer ring 9 has, firstly, a clamping surface 15 facing toward the front face 12 of the flange and, secondly, a clamping surface or supporting surface 16, facing radially inward toward the longitudinal axis 13 and, thirdly, a rear-facing conical surface 17. The ring 9 can also have a different appearance suitable for securing the hose, depending on, inter alia, strength requirement and mounting method.

The second outer ring 10 extends radially outside and substantially encloses both the flange 7 and the first outer ring 9, as well as the end portion of the hose, and holds this together with the tube end by having the form essentially of an inward facing U with conically inclined branches 18, 19, which diverge from one another viewed in the direction of the axis of symmetry 13. More precisely, the branches are pressed against, firstly, the conical rear-facing surface 14 of the flange 7 and, secondly, the conical surface 17 of the first outer ring 9, whilst an intermediate, in the example cylinder-jacket-shaped portion 20 forms together with the branches a closed, impact-protecting and dirt-protecting shield over the joint formed between the tube end and the hose end.

According to the invention an inner ring 21 is provided, which has the form of an annularly extending band, made of a rigid, yet resilient material such as steel. The inner ring 21 has two ends 22, 23, which, in the mounted state of the coupling, i.e. the usage state according to FIG. 1, bear one against the other and form a continuous, unbroken arc-shaped periphery. The two ring ends 22, 23 are clamped together and are expediently configured so as not to leave this position. For this purpose, the ends have sharp, transverse edges 24, 25 forming flat surface portions, which are complementarily configured so that one end 22 has a lug 26 or a projection, whilst the other end 23 has a corresponding recess 27 into which the lug 26 slides. The inner ring, furthermore, in terms of its cross-sectional shape, is expediently configured with a bowl-shaped portion 28, which is intended to form a clamping surface against a portion 29 of the hose end extending between the inner ring and the first outer ring. The bowl-shaped portion 28 is transformed, toward the edges, into two flanges 30, 31 directed straight out from one another, which substantially extend parallel with the longitudinal axis 13 of the coupling or of the tube end. As can be seen from FIG. 1, the tube end 1 is configured around the rim with an annular recess 32 having a cylinder-jacket-shaped seat surface 33, which can lend a certain support to the flange 31 of the inner ring 21, yet which, together with dimensioning of the inner diameter of the outer ring 9, i.e. the diameter of the surface 16, has the primary effect that the inner ring does not in essence constitute any turbulence-creating restriction of the fluid current in the fluid line 4.

Figure 2:
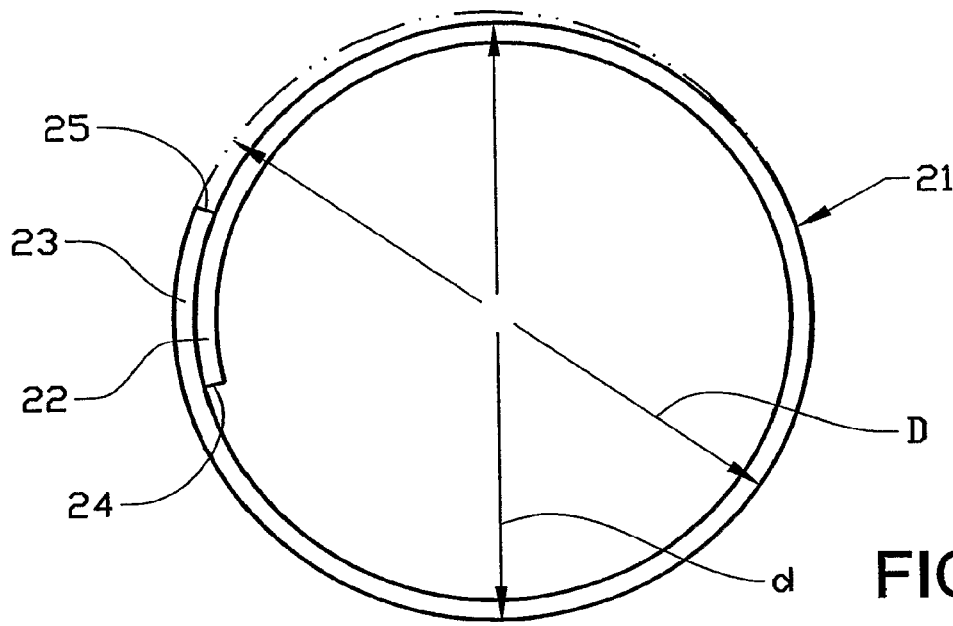
FIG. 2 is a side view of an inner ring forming part of the coupling, in a non-expanded state, i.e. prior to the finally mounted state.
Figure 3:
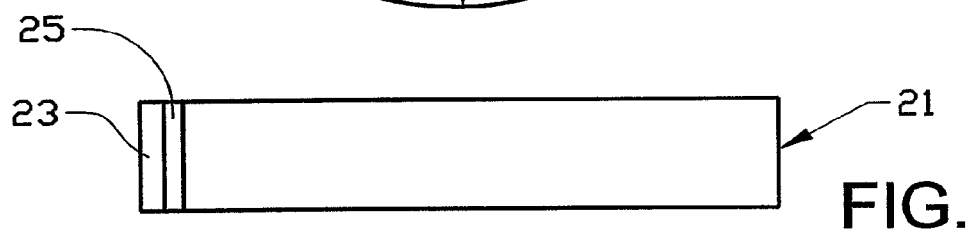
FIG. 3 is a top view of the inner ring in a corresponding state, but viewed perpendicular to the view according to FIG. 2.

FIGS. 2 and 3 show the inner ring 21 viewed respectively, from the side and from above in its mounting state or, taken as a whole, the state which the inner ring assumes prior to its finally mounted state. In the mounting or storage state, the two ends 22, 23 of the ring are mutually overlapping, i.e. with one end 22 radially inside the other end 23. This state is an unloaded state which the inner ring assumes without any external influence, in which the ring assumes a substantially circular form having a diameter d which is less than the diameter which the ring assumes in its finally mounted state. In this finally mounted state, the inner ring therefore assumes a larger diameter D with an outer contour, which is indicated by a dash-dot line in FIG. 2, when the end edges 24, 25 are forced to butt one against the other and assume a pretensioned position as described above.

The process for mounting the coupling according to the invention advantageously proceeds as follows. Firstly, the first outer or external ring 9 is threaded over the free end portion of the hose, which is made possible by the elasticity of the hose and the compressibility. The edge portion of the hose is configured such that it fits both against the flange 7 of the tube connection and against the outer ring 9. The inner diameter of the outer ring, i.e. the diameter of the surface 16, is at least partially adapted to conform to the bowl-shaped portion 28 of the inner ring 21.

After the first outer ring 9 has been mounted on the end portion of the hose 2, the inner ring 21 is introduced into the hose end portion and is positioned in its correct place in the axial direction.

In order to facilitate the positioning in the axial direction, the end portion of the hose can be configured with a portion in which the bowl-shaped portion 28 of the inner ring, and possibly also the flanges 30, 31 of the ring, fit.

Figure 4:
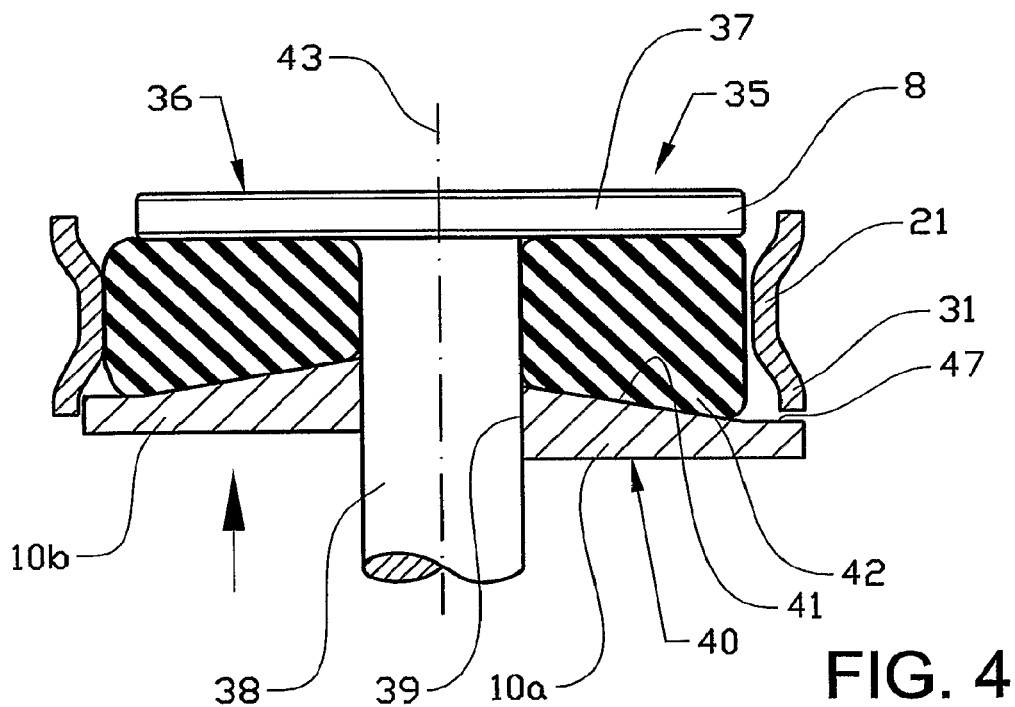
FIG. 4 is a partially broken section through a tool for mounting the inner ring.

Once the inner ring 21 is inserted in the axial direction to its correct place, the ring is expanded, expediently by means of some form of special tool 35, see examples below with reference to FIG. 4. In principle, the ring is pressed radially from within and outward until the ends 22, 23 of the ring no longer mutually overlap, but rather the end edges 24, 25 are brought to press one against the other. With this, the inner ring 21 therefore assumes an outer diameter D which, in its bowl-shaped portion 28, has a diameter which is somewhat less than the inner diameter of the outer ring 9, substantially in the order of magnitude equal to double the wall thickness of the rubber hose, yet in practice a somewhat larger diameter, so that the hose is compressed and clamped against the surface 16 of the outer ring.

After the first outer ring 9 has been mounted on the end portion of the hose 2 and the inner ring has been mounted in the hose, the clamp 10 is threaded over either the flange 7 of the tube connection or over the hose end and is, in conjunction with this, shaped so as to permit bearing contact of the hose end against the tube flange. After this, the hose end is connected to the tube connection 1, more precisely its flange 7, so that the end portion 8 of the hose is brought to bear against the front face 12 of the flange 7. At this stage, the clamp has still not assumed the enclosing U-shape, but may have, for example in a first position, a cylindrical ring shape, after which the clamp is bent over by means of a press tool, for example a hydraulic press for bending down both flanges 18, 19 of the clamp into close connection against, firstly, the rear-facing edge 14 of the flange and, secondly, the supporting edge 17 of the outer ring. Clamping of the hose end between the front face 12 of the flange and the supporting surface 15 of the outer ring is thereby secured.

As has been stated above, a special tool 35 is advantageously used to expand the ring from its starting position or mounting position, indicated by a continuous line in FIG. 2, and into its finally mounted position, indicated by a dash-dot line in the same figure. An example of such a tool is shown in FIG. 4 and comprises a fixed part 36, i.e. a part which forms a fixed counterstay during the expansion movement. The fixed part consists of a counterstay plate 37, which expediently is circular and has a smaller diameter than the minimum diameter of the hose and hence can be introduced into the hose through its open end. The dolly plate 37 is supported by a shank 38, which either is held manually by an operator or is held in a fixture. The shank extends through a hole 39 in a moving part 40 which is axially displaceable relative to the axis of symmetry 43. In the illustrated example, the moving part, which is likewise configured as a plate, has a conical surface 41 which is inclined such that an interspace between the moving plate and the fixed plate is larger in the direction radially outward from the axis of symmetry 43. In the interspace there is disposed a ring 42 made of elastic material, such as rubber. In the non-compressed state, the elastic ring 42 has a diameter which substantially corresponds to the diameter of the fixed plate, i.e. is less than the inner diameter of the hose.

The assembly tool 35 which is described above is. used as follows. When the inner ring 21 is to be mounted in place through the opening 6 in the hose, the inner ring is threaded onto the tool and is, in conjunction with this, in its unloaded state indicated by continuous lines in FIG. 2. The ring and the tool are then in the position which in FIG. 4 is shown to the right of the axis of symmetry 43 of the tool in FIG. 4. It can here be seen that the moving plate 40 expediently has a diameter which exceeds the diameter of the ring in its unloaded state, so that the moving plate forms a stop face 47 against the flange 31 of the ring. The ring is consequently held in a stable position when the tool, with threaded-on inner ring, is introduced through the hose opening into a correct axial position along the longitudinal axis 13 directly opposite the outer ring 9. Whilst the fixed part 36 is held secured, an axially directed pressure is applied to the moving part, see to the left of the longitudinal axis 43, in connection with which the elastic ring 42 is made to expand radially outward and thereby also expands the inner ring 21, until the two end edges 24, 25 have passed one another, the inner end 22 finishing up directly opposite the outer end and the two edges being placed one against the other and assuming a stable clamped position. After this, the moving part 40 can be guided back by removal of the axial pressure, whereupon the elastic ring returns to its non-expanded position and the tool can be drawn out of the opening in the hose end. The pressure movement against the moving part 40 may possibly be effected manually by pressing against the plate with one hand, alternatively the movement can be performed by a-further part (not shown) of the tool.

It is also possible to provide the moving plate 40 and the shank 38 each with an oppositely threaded portion for rotatable expansion of the elastic ring 42. The shank 38 is shown broken and can have a suitably adapted length for practical handling, for example at least double or triple the length shown.

Figure 5:
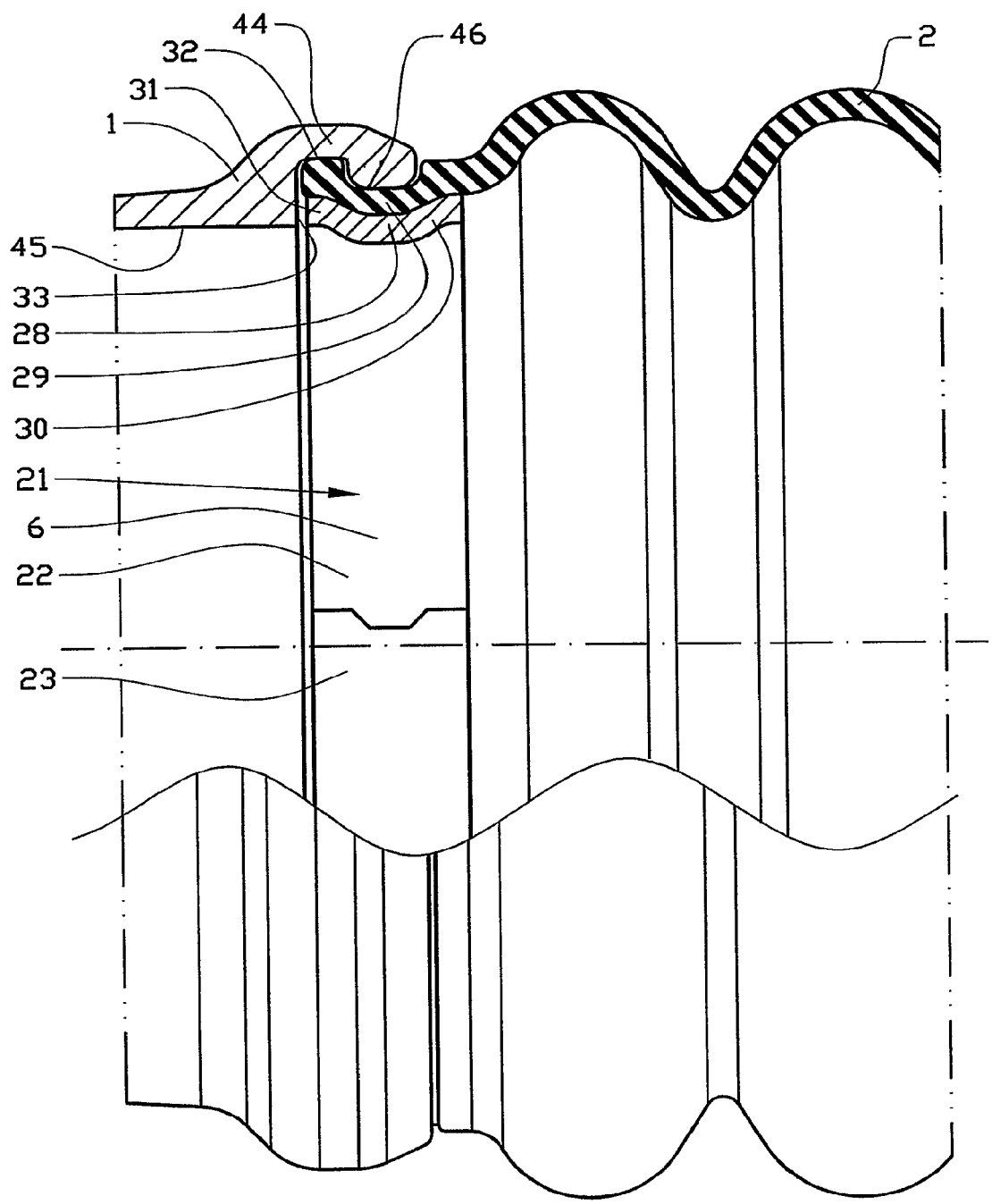
FIG. 5 shows an assembled coupling according to the invention in a second illustrative embodiment

In the second embodiment, which is shown in FIG. 5, the tube connection 1 and, more precisely, its flange, here denoted by 44, have a different configuration than that which is shown and described in the first embodiment, in which the flange 7 has a substantially radially directed flange with a supporting surface for the hose end lying in the radial plane. In the second embodiment, the flange 44 has a substantially axially directed extent, yet advantageously with a step radially outward compared with the cylindrical inner wall of the tube end. This provides space, as in the first embodiment, for a recess 32, which has a cylinder-jacket-shaped supporting surface 33 for one edge flange 31 of the inner ring 21. Instead of the two outer rings in the first embodiment, the flange 44 with its inward facing supporting surface 46 acts as the counterstay surface against which the inner ring 21 is braced. The hose end is advantageously configured so that it connects optimally to the flange.

Advantageously, the flange is configured so that the supporting surface 46 of the flange forms a groove-shaped recess in the flange. In this recess, a corresponding configuration of the hose end can be fitted, whereby the hose is securely held in the axial direction.

Otherwise the inner ring 21 is identical to the ring in the first example, as are its functioning and its mounting, so that, as regards a description of its structure and installation, which can be performed, for example, with the above-specified assembly tool, reference is made to the description of the first example.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

The invention is not limited to the illustrative embodiments described above and shown in the drawings, but can be varied within the scope of the following patent claims. For example, the inner ring can be wholly cylindrical and the outer ring can be of circular or rectangular cross-sectional form. The clamp 3 can have a different cross-sectional form, for example semicircular.

The invention claimed is:

1. A coupling arrangement for connecting an elastic hose and a rigid tube connection in a fluid line, comprising:
    a hose made of an elastic material;
    a rigid tube connection having a peripheral, rigid rim to which an end of the hose is adapted to be connected, and at least one rigid supporting member with a radially inward facing annular supporting surface being arranged so as to offer support to the hose end at the tube connection; and
    a coupling comprising an inner ring having two end portions, wherein, prior to and in a mounting state, the two end portions of the inner ring are adapted to overlap so that the inner ring has a first diameter smaller than an inner diameter of the hose and wherein, in a mounted state inside the hose in which the inner ring is opposite the inward facing supporting surface, the two end portions are adapted to be pressed together, end to end, to maintain a second diameter larger than the first diameter to clamp the hose end between the inner ring and the inward facing supporting surface, wherein a cross section of the inner ring is substantially arcuate and wherein the inward facing supporting surface in the supporting member is correspondingly arched.

2. The coupling arrangement as claimed in claim 1, wherein the supporting member comprises an outer ring, the outer ring comprising a radially inward facing surface forming the supporting surface, and wherein the outer ring is held together with a radially outward facing flange of the tube connection by an annular clamp enclosing the flange and the outer ring.

3. The coupling arrangement as claimed in claim 2, wherein the end portions of the inner ring have transverse edges which are complementarily shaped such that a transverse edge of one end portion has a projection and a transverse edge of the other end portion has a corresponding recess.

4. The coupling arrangement as claimed in claim 2, wherein the inner ring has edge flanges which extend from an arcuate portion of the inner ring.

5. The coupling arrangement as claimed in claim 2, wherein the tube connection has an annular recess in its rim, the annular recess being configured to receive an edge flange of the inner ring.

6. The coupling arrangement as claimed in claim 1, wherein the supporting member comprises a flange of the tube connection, the flange extending substantially in a shape of a cylinder jacket.

7. The coupling arrangement as claimed in claim 6, wherein the end portions of the inner ring have transverse edges which are complementarily shaped such that a transverse edge of one end portion has a projection and a transverse edge of the other end portion has a corresponding recess.

8. The coupling arrangement as claimed in claim 6, wherein the inner ring has edge flanges which extend in a shape of a cylinder jacket and extend from a bowl-shaped portion of the inner ring.

9. The coupling arrangement as claimed in claim 6, wherein the tube connection has an annular recess in its rim, the annular recess being configured to receive an edge flange of the inner ring.

10. The coupling arrangement as claimed in claim 1, wherein the end portions of the inner ring have transverse edges which are complementarily shaped such that a transverse edge of one end portion has a projection and a transverse edge of the other end portion has a corresponding recess.

11. The coupling arrangement as claimed in claim 1, wherein the inner ring has edge flanges which extend from an arcuate portion of the inner ring.

12. The coupling arrangement as claimed in claim 1, wherein the tube connection has an annular recess in its rim, the annular recess being configured to receive an edge flange of the inner ring.

13. A process for connecting a hose to a rigid tube connection having a peripheral rim to which a hose end, made of elastic material, is to be connected, comprising:

introducing an inner ring into the hose in a mounting state with two ends mutually overlapping, so as to lend the ring a first diameter smaller than an inner diameter of an end of the hose;

positioning the inner ring directly opposite a rigid supporting member of the tube connection, the rigid supporting member having a radially inward facing supporting surface, the hose end being disposed between the supporting member and the supporting surface;

pressing the inner ring radially outward against the hose end such that the two ends of the ring are pressed together, end to end, to maintain a second diameter larger than the first diameter to clamp the hose end against the supporting surface; and connecting the hose end to the tube connection by a binding clamp that encompasses a peripheral rim of the tube connection and the hose end.

14. A method of connecting an elastic hose to a rigid tube connection to form an arrangement in a fluid line, the arrangement comprising the hose made of an elastic material, the rigid tube connection having a peripheral, rigid rim to which an end of the hose is adapted to be connected, and at least one rigid supporting member with a radially inwardly-facing annular supporting surface being arranged so as to offer support to the end of the hose end at the tube connection, and a coupling comprising an inner ring having two end portions, wherein, the method includes steps of:

prior to and in a mounting state, arranging for the two end portions of the inner ring to overlap so that the inner ring has a first diameter smaller than an inner diameter of the hose; and in a mounted state inside the hose in which the inner ring is opposite the inwardly facing supporting surface, pressing together the two end portions, end to end, to maintain the inner ring to have a second diameter larger than the first diameter to clamp the end of the hose end between the inner ring and the inwardly-facing supporting surface, wherein a cross section of the inner ring is arcuate to provide a recess and wherein the inwardly-facing supporting surface in the supporting member is correspondingly arched.

* * * * *